United States Patent [19]
Huang et al.

[11] Patent Number: 5,658,081
[45] Date of Patent: Aug. 19, 1997

[54] ADJUSTING MECHANISM FOR A PRESTRESSED BEARING ARRANGEMENT

[75] Inventors: Chun-Hung Huang, Chutung, Hsin Chu; Lin-Chan Tsai, Hsin Chu, both of Taiwan

[73] Assignee: Industrial Technology Research Institute, Taiwan

[21] Appl. No.: 570,491

[22] Filed: Dec. 11, 1995

[51] Int. Cl.⁶ .............................. F16C 19/50; F16C 33/66
[52] U.S. Cl. ................................................ 384/447; 384/517
[58] Field of Search ................................. 384/517, 518, 384/519, 563, 447

[56] References Cited

U.S. PATENT DOCUMENTS

| | | | |
|---|---|---|---|
| 1,183,788 | 5/1916 | Whitney | 384/447 |
| 3,804,477 | 4/1974 | Allmandinger et al. | 384/447 |

FOREIGN PATENT DOCUMENTS

| | | | |
|---|---|---|---|
| 0533399 | 3/1993 | European Pat. Off. | 384/447 |
| 1670213 | 8/1991 | U.S.S.R. | 384/517 |
| 0627260 | 8/1949 | United Kingdom | 384/517 |
| 2143909 | 2/1985 | United Kingdom | 384/447 |

*Primary Examiner*—Daniel P. Stodola
*Assistant Examiner*—Matthew A. Kaness
*Attorney, Agent, or Firm*—Beveridge, DeGrandi, Weilacher & Young, L.L.P.

[57] ABSTRACT

A prestressed adjusting mechanism of a bearing is provided with a first and a second rhombic prism ring which are placed opposite each other with a flexible partitioning ring inserted between them. There are multiple channel holes on the flexible partitioning rings, each containing a steel ball. The adjusting mechanism, after being assembled, is installed in the prestressed arrangement of a bearing. It will generate outward action on both sides by increasing the rotational speed of the spindle. The higher the rotational speed, the larger the reaction that counteracts the prestressed forces of the bearing, whereby, the bearing can sustain a high prestressed force to generate high rigidity and conversely sustains low prestressed force. In this way, the bearing can maintain a relatively longer usage life.

4 Claims, 4 Drawing Sheets

ADJUSTING MECHANISM FOR A PRESTRESSED BEARING ARRANGEMENT

FIELD OF THE INVENTION

The present invention is a prestressed adjusting mechanism of a bearing in particular, is the one that counteracts part of the prestressed forces of the bearing by use of the principle of centrifugal force of the steel balls, thereby, to make the bearing take light prestressed force at high speed and take heavy prestressed force at low speed.

BACKGROUND OF THE INVENTION

The bearing, as we can see in daily life, possesses clearance among their parts which seriously affects the precision of the overall assembly when it applies to assembling machines with relatively high precision; therefore, in order to eliminate the clearance inside the bearing, a prestressed force is applied on the bearing. But the rigidity of the bearing will vary under different prestressed forces. In general, the rigidity is higher when the prestressed force is large and lower when the prestressed force is small. Generally, heavy prestressed force is used for machines with high loading and light prestressed force is used on the bearing for machines with low loading.

What is more, the rotational speed is a very important factor to a bearing. The higher the rotational speed is, the lower usage life it is. Particularly, for the machine designed at high speed and also with high prestressed force, it is apt to result in suddenly dropping of bearing life. Therefore, the prior art's design, in most part, employs light prestressed force when it comes to bearing application at high speed.

As we can see in general application, for some machine assemblies, like the spindle of machine tool, the range of rotational speed is very wide, anywhere from tens of rpm to thousands of rpm and even up to tens of thousands of rpm. All of these are possibly the required speed range. In this situation, if we choose the light prestressed force and alleviate the problem of lower life at high speed, it will end up with the fact that the whole mechanism cannot sustain relatively heavier load at low speed. The inventors, therefore, in order to overcome the limitation of these applications at both high and low speed, perform testing in all respects and finally result in the design of present invention through countless trials and errors and have made it possible that a bearing has light prestressed force at high speed and heavy prestressed force at low speed.

SUMMARY OF THE INVENTION

The main purpose of the present invention is to provide a prestressed adjusting mechanism of a bearing which makes use of the combination of two rhombic prism rings and places a flexible partitioning ring between them. Multiple channel holes are established to uniformly distribute on the flexible partitioning ring steel balls contained within. The adjusting mechanism is then installed in the prestressed arrangement of the bearing which generates axial thrust by use of the increasing of machine tool's spindle speed such that those multiple steel balls are subjected to centrifugal action. Furthermore, it makes the action on both sides of the adjusting mechanism increase which in sequence, make the action of the prestressed part on the bearing balls counteract by the said action, thereby lower the actual prestressed forces.

The other purpose of the present invention is to disclose that the adjustment of the magnitude of the prestressed force can depend upon the increasing or decreasing of the rotational speed, thereby, it can effectively prolong the bearing life.

Therefore, in order to disclose in detail the purposes, characteristics and efficacies of the present invention, the inventors herewith make a detailed description, by use of the following embodiments and accompanied by the drawings attached, as follows:

DESCRIPTION OF THE COMPONENT NUMBERS IN THE DRAWINGS

Figure 1:
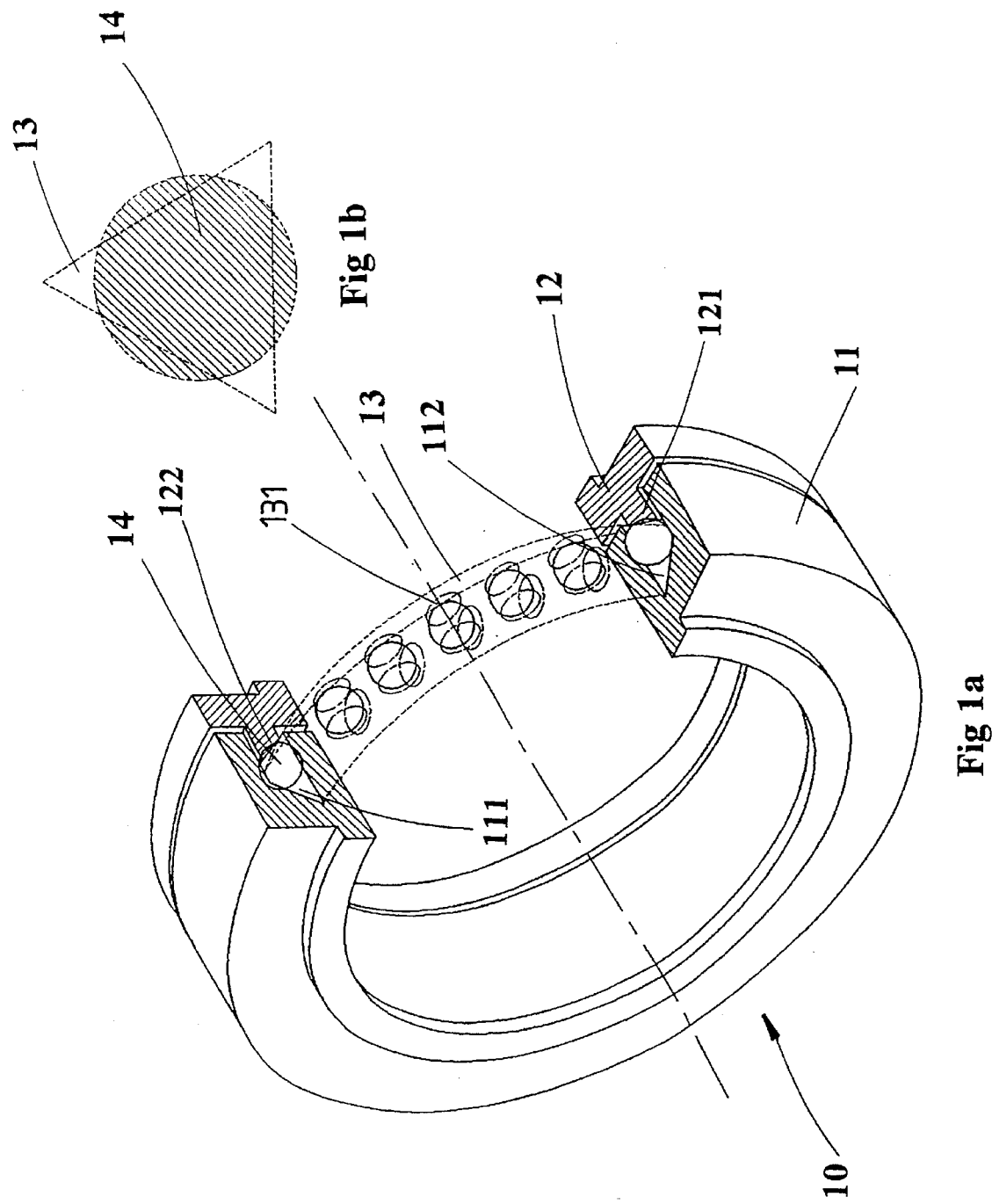
FIG. 1(a) is the isometric section view of the present invention.
FIG. 1(b) is a section view of the flexible ring shown in FIG. 1(a).

10 Adjusting mechanism
101 Arc-shape channel
11 The first rhombic prism ring
111 The concave channel
112 The first rhombic prism plane
12 The second rhombic prism ring
121 The protruded block
122 The second rhombic prism plane
13 The flexible partitioning ring
131 The channel holes
14 The steel balls
20 The spindle of a machine tool
21 The bearing
30 The spring

DETAILED DESCRIPTION OF THE INVENTION

Referring to the views of the present invention in FIGS. 1(a) and 1(b) where the prestressed adjusting mechanism 10 of the bearing comprises the first rhombic prism ring 11 and the second rhombic prism ring 12 wherein a concave channel 111 is established at an appropriate place on the said first rhombic prism ring 11 with its bottom plane being the first rhombic prism plane 112. The second rhombic prism ring 12 is placed opposite to the first rhombic prism ring 11 on which a protruded block 121 is established at an appropriate place and the protruded block 121 has a shape corresponding to the above-mentioned concave channel 111 of the first rhombic prism ring 11 and on its side plane, 122 a second rhombic prism plane is set up with its inclined angle equaled to that of the first rhombic prism plane 111 as mentioned above. A flexible partitioning ring 13 is placed in the concave channel 111 of the first rhombic prism ring and multiple channel holes 131 are established and uniformly distributed over the flexible partitioning ring 13 with steel balls 14 slightly protruding out of the flexible partitioning ring 13. Thus, the first rhombic prism ring 11 and the second rhombic prism ring 12, both contain flexible partitioning ring, embed each other, and the protruded block 121, which is on the second rhombic prism ring 12 and is tightly fixed to the concave channel 111 of the first rhombic prism ring 11, presses against the said flexible partitioning ring 13, thereby becoming an integral body and becomes an adjusting mechanism 10.

Figure 2:
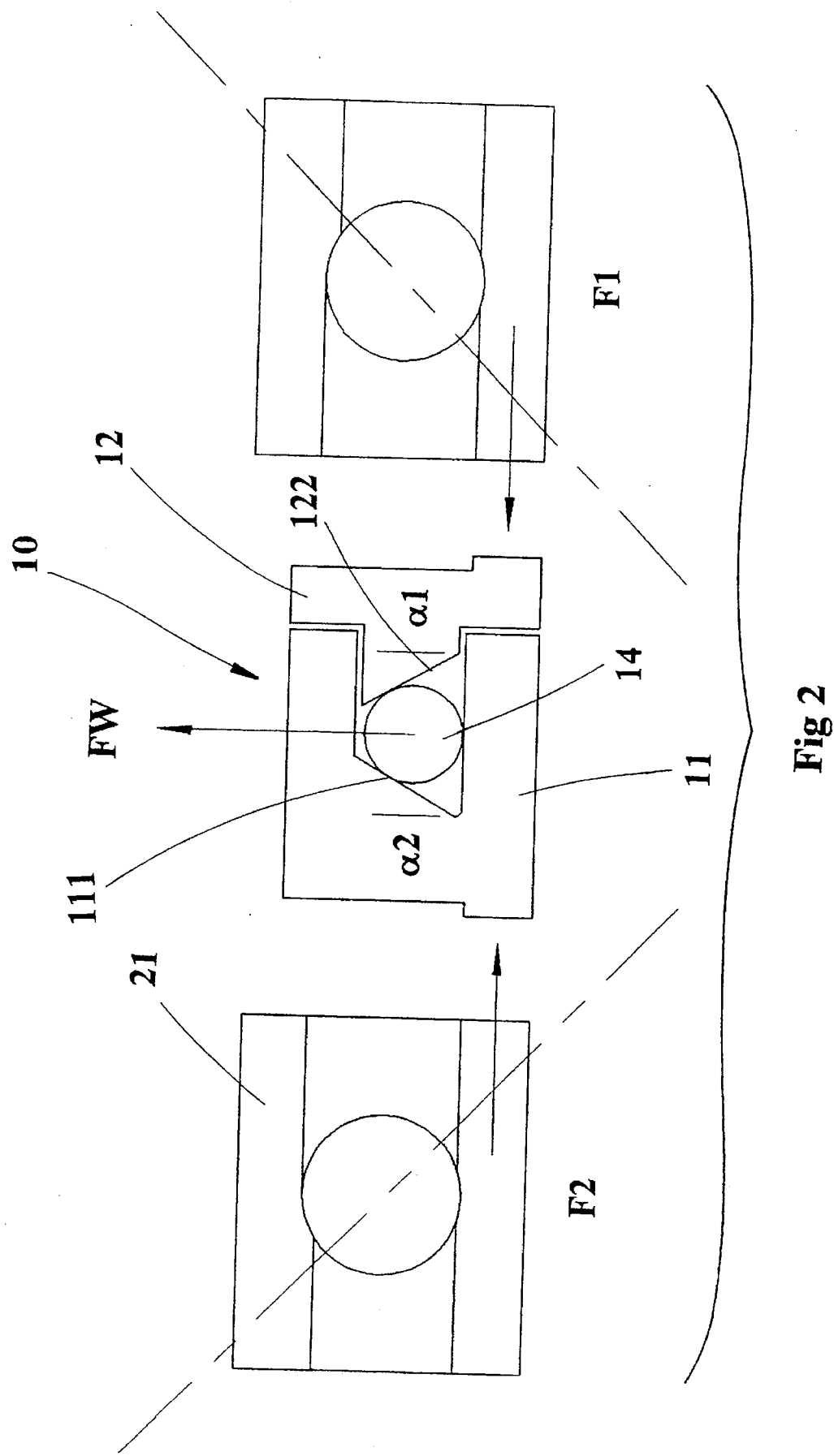
FIG. 2 is the force diagram of the present invention.

FIG. 2 is the force distribution diagram of the present invention. It installs adjusting mechanism 10 in the prestressed arrangement of the bearing. The forces on both sides of the said adjusting mechanism 10 is very close to the inner ring's action (F1 F2), as the speed of the machine tool's spindle increase, the steel balls contained in it are subjected to the centrifugal force (Fw) which make all the steel balls in the ring act in radial direction. The steel balls 14, then, generate radial (outward) thrust which can counteract the inner ring action F1 and F2 of the bearing since the steel balls are constrained by the first and second rhombic prism plane. The higher the rotatating speed, the larger the thrust will be, and the more the inner ring's action of the bearing to be counteracted, which makes the actual prestressed force lower. In the meantime, the more the steel balls 14 contain in the flexible partitioning ring 13 the higher the centrifugal force becomes, and so does the force components on both sides, then it proceeds to refine the prestressed force. It thereby can attain the fact that the bearing sustains relatively heavy prestressed force and generate the effect of high rigidity at low speed and sustains only light prestressed force and maintains relatively longer life of bearing at high speed.

Figure 3:
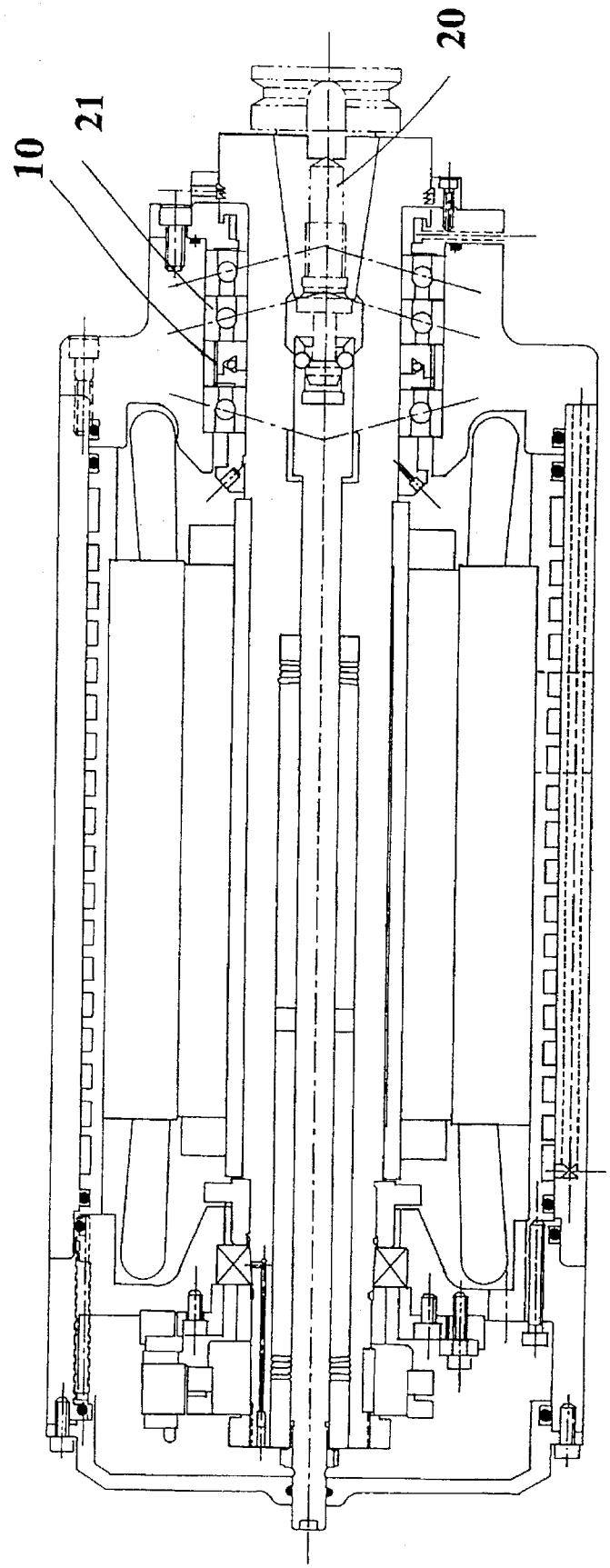
FIG. 3 is a module applied to the spindle of a machine tool of the present invention.
Figure 4:
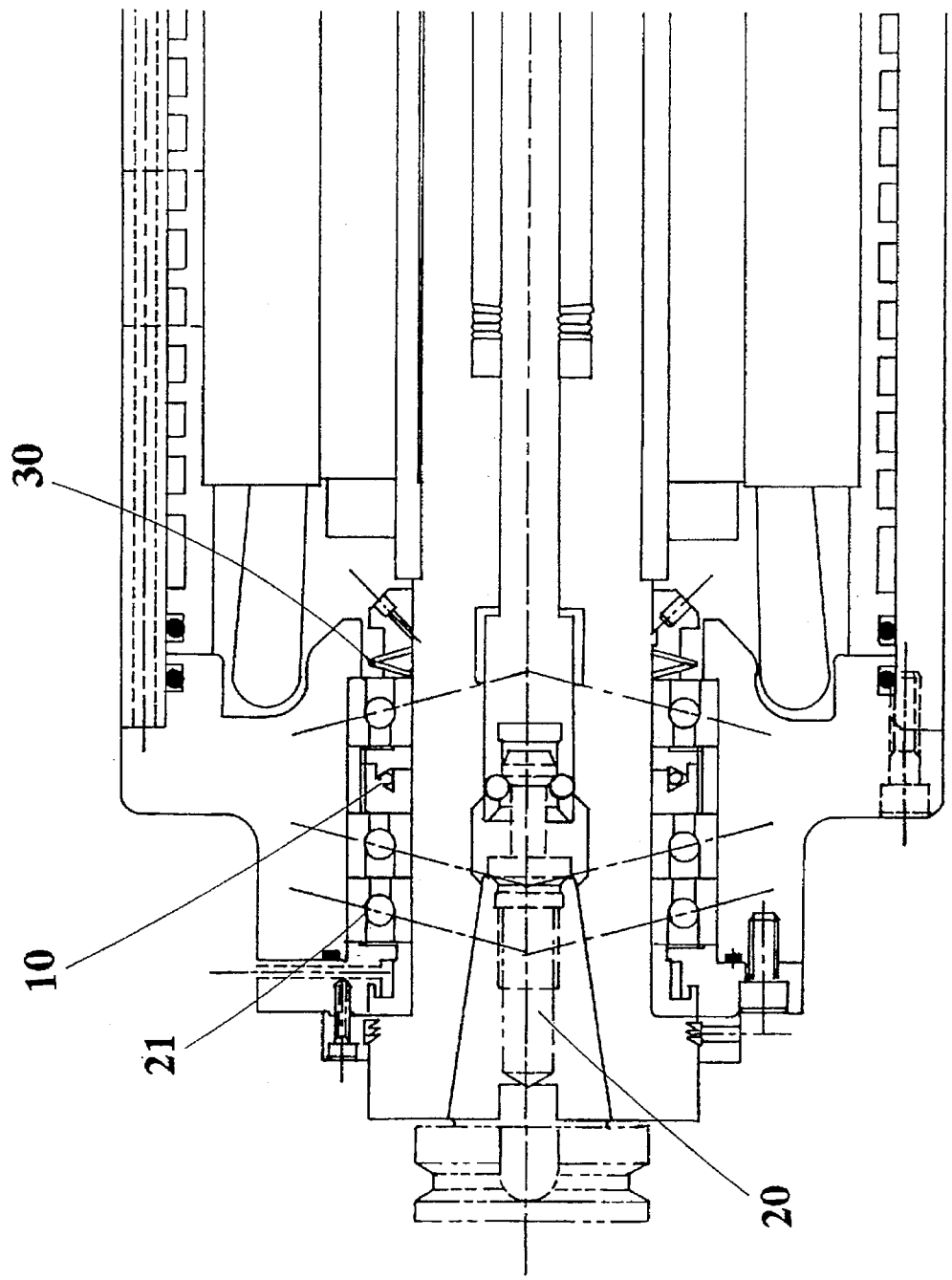
FIG. 4 is another embodiment of the present invention.

FIG. 3 is the module of the present invention applied in the spindle of machine tools. On the machine tool's spindle shown in the drawing, the adjusting mechanism 10 is installed in series with the front bearings 21 which is arranged with prestressed forces in "O" syle and the said adjusting mechanism 10 is installed exactly between the two front bearings 21. The steel balls in the adjusting mechanism 10 are sustained by the centrifugal force by accelerating the speed of the machine tool's spindle and acting in radial and outward direction, thereby, generating axial thrust to push the inner rings of the bearings 21 on both side to expand outward, thereby, to eliminate the clearance forces in bearing 21 which lower the prestressed force in it.

Referring again the another embodiment of the present invention. Besides installing the adjusting mechanism 10, it also installs springs 30 which provide the main prestressed forces for the bearings 21. Similarly, the actions generated by changing the speed of the adjusting mechanism 10 can also change the prestressed forces of the bearings.

To summarize the statements as mentioned above, we can see that the present invention is practical and original and is not found in any publications and is in compliance with the patentabilities.

Although the present invention has been illustrated and described previously with reference to the preferred embodiments thereof, it should be appreciated that it is in no way limited to the details of such embodiments, but is capable of numerous modification within the scope of the appended claims.

What is claimed is:

1. An adjusting mechanism for a prestressed bearing arrangement, comprising:

a first prism ring having a channel defined therein, a bottom side of said channel comprising a first prism plane;

a flexible partitioning ring received in said channel and having a plurality of channel holes uniformly defined therein;

a second prism ring having a protruded block extending therefrom, an edge of said protruded block comprising a second prism plane, said protruded block received in said concave channel of said first prism ring such that said flexible partitioning ring is maintained within said channel between said first prism plane and said second prism plane; and a plurality of balls, each of said plurality of balls being contained in each of said channel holes of said flexible partitioning ring, wherein when said adjusting mechanism is rotated, said balls contained within said flexible partitioning ring experience a radial movement, said radial movement of said balls causing said first prism plane or said second prism plane to move axially, thereby counteracting prestressed forces on said bearing arrangement to adjust said prestressed forces.

2. An adjusting mechanism for a prestressed bearing arrangement as defined in claim 1, wherein said first and said second prism planes of said first and said second prism rings have equal inclined angles.

3. An adjusting mechanism for a prestressed bearing arrangement as defined in claim 1, wherein said flexible partitioning ring is substantially triangular in shape.

4. An adjusting mechanism for a prestressed bearing arrangement as defined in claim 1, further comprising a spring in axial alignment with said adjusting mechanism.

* * * * *